United States Patent Office 3,165,130
Patented Jan. 12, 1965

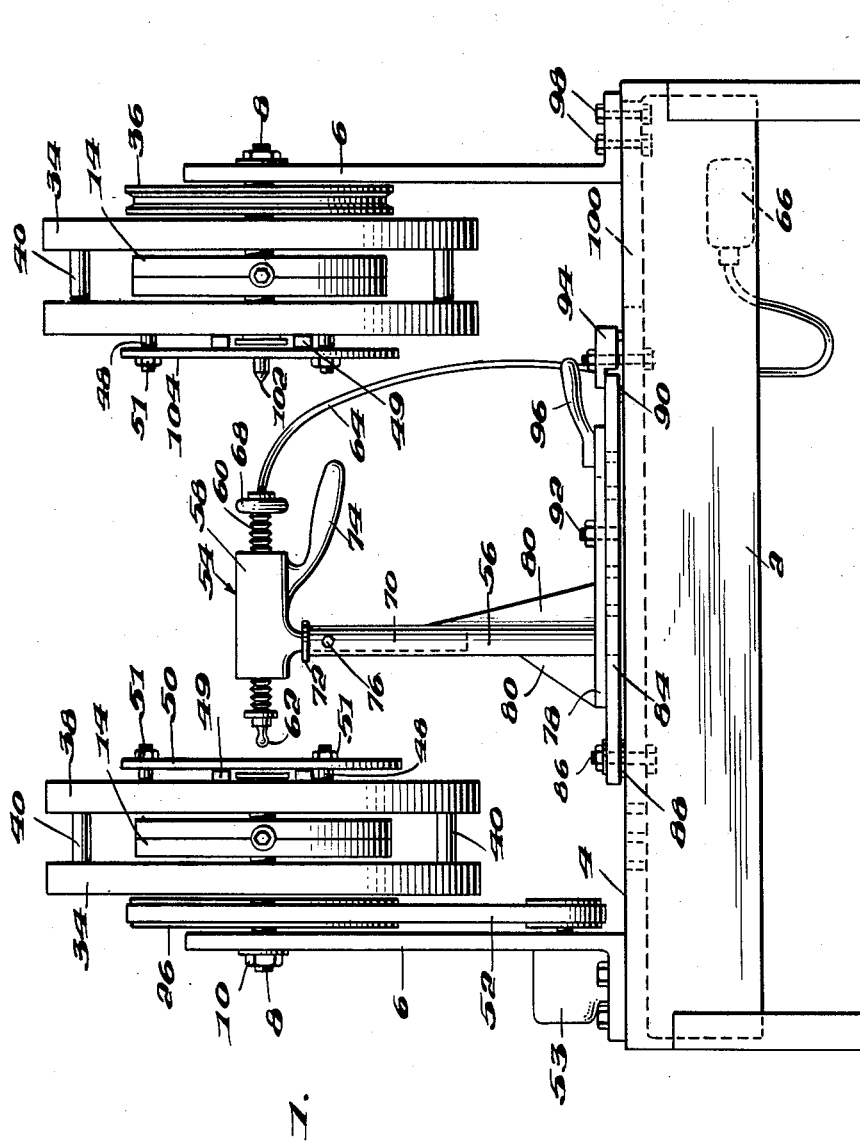

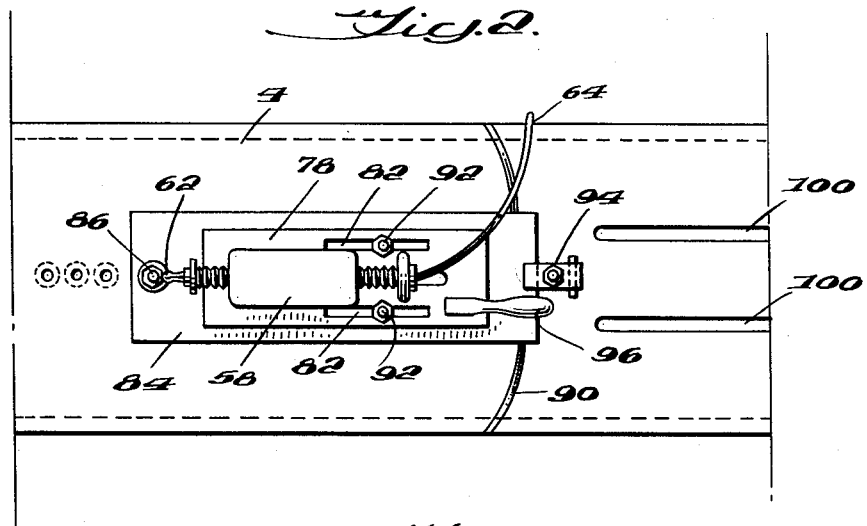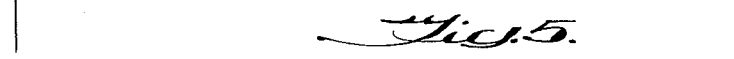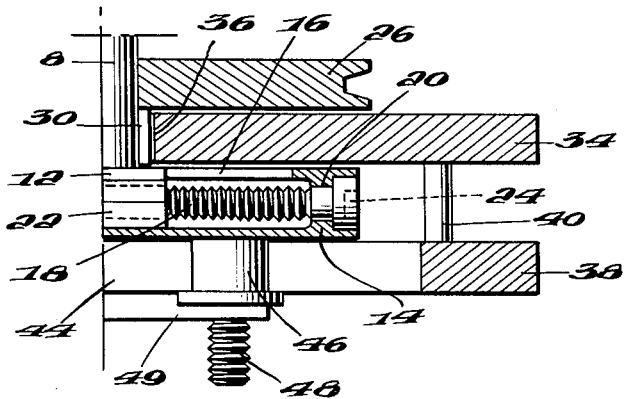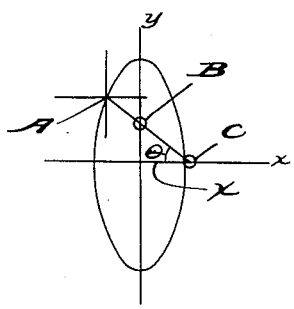
INVENTOR
VESTAL O. SANDERS,
BY
ATTORNEYS

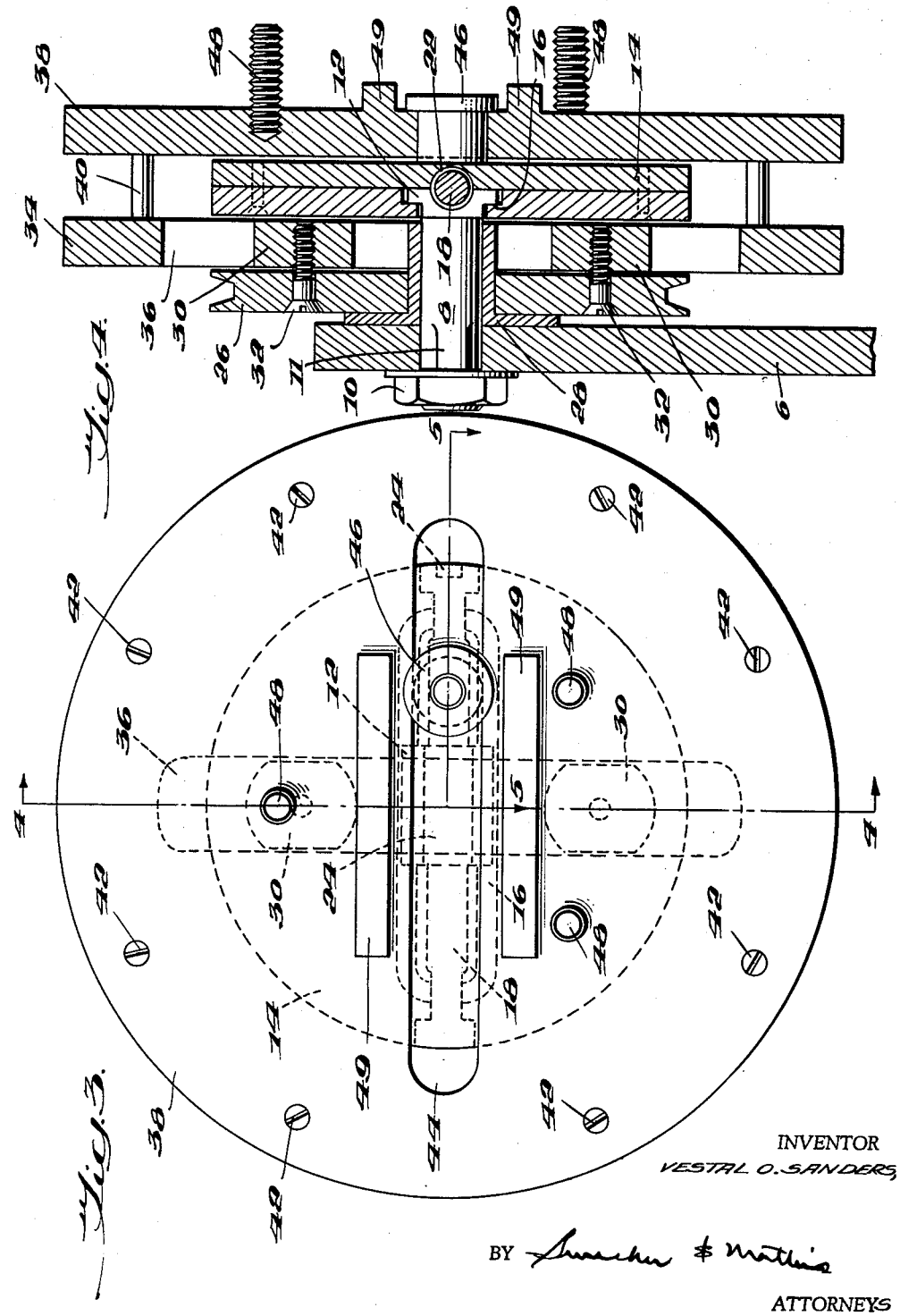

---

3,165,130
MACHINE FOR CUTTING ELLIPTICAL SHAPES
Vestal O. Sanders, 4802 Inskip Drive, Knoxville, Tenn.
Filed Feb. 21, 1961, Ser. No. 90,828
5 Claims. (Cl. 144—33)

This invention relates to lathes, and, more particularly, to a machine for cutting elliptical shapes.

In recent years, elliptically shaped bowls and furniture legs have become extremely popular. To meet this demand, manufacturers have been forming these elliptical shapes by hand or by expensive machining methods. The methods heretofore used cannot be adapted to mass production techniques and, accordingly, the products are necessarily expensive.

Elliptical shaped bowls are particularly difficult to manufacture according to prior methods because the cutting operation must be three dimensional. The cutter must trace an elliptical cross section and, at the same time, a circular vertical section. It has been customary, heretofore, to cut out an elliptical block and carve out the inside of the bowl by hand to achieve an approximately elliptical cross section. Such methods are obviously slow and inaccurate.

In view of the defects of the methods heretofore used, it is an object of this invention to provide a machine for forming elliptical shapes.

Another object of this invention is to provide a machine for forming elliptical bowls.

A further object of this invention is to provide a machine for forming elliptical shaped furniture legs.

A still further object of this invention is to provide a machine for rapidly and inexpensively forming elliptical shapes.

The foregoing objects and others ancillary thereto I prefer to accomplish as follows:

According to one embodiment of the invention, an ellipse forming head is mounted on the headstock end of a bench. The head is so constructed that a point on its face plate will circumscribe an ellipse when the head is rotated. The eccentricity of the ellipse is adjustable. The work piece is attached to the head so that it will rotate in an elliptical pattern as the head rotates.

A pointed cutter is mounted perpendicular to the plane of the work piece. The cutter may be pivoted either about an axis on the cutter side of the work, or about an axis on the head side of the work, thus forming the interior cavity and exterior, respectively, of the bowl.

A tailstock is mounted on the bench and it is also provided with an ellipse forming head. Long pieces of work, such as furniture legs, are mounted between the headstock and tailstock and, accordingly, circumscribe ellipses as the heads rotate. As a cutter moves longitudinally along the length of the work it will generate an elliptically shaped piece.

This preferred embodiment of the invention is illustrated in the accompanying drawings, in which:

FIG. 1 is a view in elevation of the ellipse forming lathe.

FIG. 2 is a top plan view of the cutter and mounting plates.

FIG. 3 is a detail plan view of the ellipse forming head.

FIG. 4 is a cross-sectional view of the ellipse forming head along the lines 4—4 in FIG. 3.

FIG. 5 is a cross-sectional view along the lines 5—5 in FIG. 3.

FIG. 6 is a simplified view of the ellipse forming head.

The ellipse forming machine, according to a preferred embodiment of the invention, is mounted on a bench 2 having a flat bed 4. A post or support 6 is secured to the bed 4 at the head stock end of the bench.

Referring to FIGS. 3 and 4 a shaft 8 is secured to the support post 6 by means of a nut 10. The portion of the shaft which extends through the support post 6 is formed in a hexagonal cross section 11 and the hole in the support post 6 is correspondingly hexagonal shaped. The hexagonal portion 11 prevents the shaft 8 from rotating. The close fit between the hole in the post 6 and the hexagonal portion 11 provides support for the cantilever shaft 8. The free end of the shaft 8 is formed into a slide block 12. A positioning plate 14 is composed of two sections which are assembled together to enclose the slide block 12 within a transverse slot 16 in one of the sections.

Referring to FIG. 5, a lead screw 18 is also clamped between the two sections of the positioning plate 14. The ends of the lead screw 18 are journaled in bearings 20 formed in the plate 14 at both ends of the lead screw 18, so that the lead screw may be rotated. An internally threaded sleeve 22, which engages the lead screw 18, is secured to the slide block 12. A hexagonal socket 24 in one end of the lead screw 18 is adapted to be engaged by a wrench to rotate the lead screw. When the lead screw 18 is rotated, the positioning plate 14 will be moved transversely relative to the slide block 12 by the threaded sleeve 22.

A pulley 26 is journalled on a bushing 28 which is mounted on the shaft 8. One end of the bushing 28 is flanged to form a spacer between the post 6 and the pulley 26. Two blocks 30 are positioned on a diameter of the pulley, on opposite sides of, and equidistant from, the center of the pulley 26. The blocks 30 are secured to the pulley 26 by means of screws 32. Interposed between the positioning plate 14 and the pulley 26, is a guide plate 34 which is journaled on the shaft 8 and rotatable relative thereto. A slot 36 in the guide plate 34 is adapted to engage the blocks 30 therein.

A face plate 38 is mounted on the opposite side of the positioning plate 14. The guide plate 34 and the face plate 38 are secured together in axial alignment by means of spacers 40 and screws 42. There is sufficient separation between the plates 34 and 38 to permit them to rotate relative to the positioning plate 14. The face plate 38 is provided with a slot 44 which is positioned at 90° to the slot 36 in the guide plate 34. A roller 46 is secured to the positioning plate 14 and extends through the slot 44 in the face plate 38.

Studs 48 are provided in the face plate 38 for engaging conventional work holding devices. Ridges 49 are provided adjacent the slot 44 to permit the roller 46 to oscillate without interference from the work piece. A screw plate 50 may be used to mount the work piece. A wood work piece, for example, may be secured to the screw plate 50 by wood screws which extend through holes in the plate 50 and into the work piece.

The screw plate 50 is provided with slots in position to permit the studs 48 to extend through the plate 50 and the plate is clamped against the ridges 49 of the face plate 38 by nuts 51 on the studs 48. The slots in the screw plate 50 facilitate the centering of the work piece.

Referring to FIG. 1, the pulley 26 is rotated by a belt 52, which is driven by a motor 53. The positioning plate 14 and shaft 8 remain stationary, and the pulley 26 rotates relative thereto. The blocks 30 mounted on the pulley 26 impart rotation to the guide plate 34, which drives the face plate 38 through the connecting spacers 40. Radial movement of the plates 34 and 38 is imparted by the roller 46.

Referring to FIG. 3, as the blocks 30 rotate clockwise, plates 34 and 38 will move upward and to the right. After 90° of rotation of the blocks 30, the plates will have moved a sufficient distance to the right so that the roller 46 will be at the center of the plate 38. After 180° rotation, the plates 34 and 38 and the roller 46 are in the same position shown in FIG. 3, except that the roller 46 will be on the opposite side of the center of the plate 38 from that shown in FIG. 3. After 270° of rotation the plates have moved to the left and the roller 46 is positioned at the center of plate 38. As rotation continues the plates move back to the position shown in FIG. 3. Thus, as the pulley 26 rotates any point on the face plate 38 circumscribes an ellipse. The eccentricity of the ellipse may be adjusted by turning the lead screw 18 by means of a wrench inserted in the socket 24. Rotation of the lead screw 18 will cause the positioning plate 14 and roller 46 to move relative to the shaft 8, thereby increasing or decreasing the major axis of the ellipse.

Referring to FIGS. 1 and 2, a cutting tool 54 is mounted on the flat bed 4 and positioned to engage a work piece on the face plate 38. The cutting tool 54 is mounted on a hollow post 56. The cutting tool 54 has a casing 58 through which is threaded an adjusting screw 60. A cutter 62 is rotatably mounted on the end of the adjusting screw adjacent the screw plate 50. The adjusting screw 60 is hollow and a flexible shaft 64 is connected to the cutter 62 and extends through the hollow passageway in the adjusting screw 60. The opposite end of the flexible shaft 64 is attached to a motor 66. A wheel 68, secured to the adjusting screw, permits longitudinal adjustment of the tool 62.

A shaft 70 extends downward from the casing 58 and fits within the hollow post 56. A collar 72 secured to the shaft 70 bears against the top of the post 56 to maintain the cutter 62 in alignment with the horizontal center line of the positioning plate 14. The cutting tool 54 may be pivoted relative to the post 56 by means of a handle 74 secured to the casing 58. A set screw 76 is provided so that the shaft 70 may be locked against pivoting movement.

The lower end of the post 56 is affixed to a base 78. Fillets 80 are secured between the post 56 and the base 78 to provide additional support for the post. The base 78 is adjustable longitudinally of the bench 2 by means of slots 82.

The base 78 is mounted on a pivot plate 84. The pivot plate is secured to the bed 4 by means of a bolt 86. The plate 84 is spaced above the bed 4 by means of a washer 88 and the opposite end of the pivot plate rests on a flat guideway 90. Studs 92 are removably attached to the pivot plate 84 and extend upward through the slots 82 in the base 78, whereby the base 78 is clamped to the pivot plate 84. A removable clamp 94 engages the pivot plate 84 at its rearward end, adjacent the guideway 90 to prevent pivotal movement of the plate 84. A handle 96 secured to the base 78 facilitates the pivotal movement of the base 78 and pivot plate 84, when the clamp 94 is removed.

The relationships between the cutter 62 and the elliptic head are illustrated in FIG. 6. The location of the centers of a cutter 62, the shaft 8 and the roller 46 are represented by A, B and C, respectively. For simplicity all of the elements are shown in the same plane. They are actually located in parallel planes. The angle $\theta$ is the angle between the minor axis of the ellipse and a line intersecting the shaft 8 and the roller 46. The slot 44 confines the roller 46 to reciprocation along the abscissa $x$ and the slot 36 confines the shaft 8 to movement along the ordinate $y$.

The length of the semi-minor axis of the ellipse is equal to the length AB and the length of the semi-major axis is equal to AC. For each transverse position of the cutter 62 the length AC is constant during rotation of the elliptic head. The distance X between the center of the ellipse and the roller 46 is defined as follows:

$$X = BC \cos \theta$$
$$BC = AC - AB$$

When $$\theta = 0$$
$$\cos \theta = 1$$

and $$X = BC = AC - AB$$

Thus, the distance between the shaft 8 and the roller 46 which is required to produce an ellipse of the desired shape can be calculated by subtracting the length of the semi-minor axis from the semi-major axis. The adjustment must be made when the slot 44 is parallel to the lead screw 18. The position of the cutter 62 relative to the shaft 8 will determine the size of the ellipse which will be formed. It will be noted in the above equations that the cutter will circumscribe a circle when $BC = 0$. Thus, the ellipse forming head will generate a circle if the roller 46 is adjusted to be in alignment with the shaft 8.

At the tail stock end of the bench 2, an elliptic head, substantially identical to the one at the head stock end, is slidably attached to the flat bed 4. The shafts 8 of both heads are in alignment. The longitudinal position of the tail stock elliptic head is adjusted by means of bolts 98 which extend through slots 100 in the flat bed 4 to clamp the head in place.

As shown in FIG. 1, the tail stock elliptic head is provided with a live center 102 which is secured to a plate 104. Studs 48 in the face plate 38 extend through slots in the plate 104 and nuts 51 on the studs 48 clamp the plate 104 against the ridges 49. When the tail stock elliptic head is used to form long elliptical pieces, a similar plate 104 and live center 102 is clamped to the face plate 38 of the headstock elliptic head. The work piece is suspended between the live centers 102 and rotation may be imparted to the work by conventional lathe dogs. Rotation will be transmitted from the headstock elliptic head to the tailstock elliptic head through the work piece.

The ellipse forming machine may be used to cut elliptical shapes in relatively flat stock, such as bowls and platters. It may also be used to form elliptical shapes in relatively long articles such as posts or furniture legs.

To form an elliptical bowl, the rough stock, which may be wood, metal, or plastic, is secured to the screw plate 50 by means of screws or other conventional devices. To form the outside, convex surface of the bowl, the set screw 76 is tightened to prevent pivotal movement of the cutting tool 54. The clamp 94 is removed to permit pivoting of the plate 84. Adjustment of the depth of cut may be made by means of the studs 92. The radius of cut is adjusted by means of the wheel 68 which turns the adjusting screws 60. The radius of cut is the distance between the axis of the bolt 86 and the end of the cutter 62, measured along the center line of the cutter. The cutting tool is then swung out of engagement with the rough stock by means of the handle 96. Motors 53 and 66 are started which cause the elliptic head to rotate and the cutter 62 to rotate. Pivoting the base 96 will then cause the cutter 62 to engage the rough stock and further pivoting will form the convex surface on the outside of the bowl. If cuts of large depth are to be made it may be necessary to make several passes of the cutting tool, advancing the cutter by means of the screw 60 or the adjusting studs 92 after each pass.

The concave side of a bowl is formed by reversing the bowl on the screw plate 50 so that the convex side is mounted adjacent to the screw plate. The clamp 94 is tightened to prevent pivotal movement of the plate 84. The base 78 is adjusted longitudinally by means of the studs 92 for the desired depth of the cut. Set screw 76 is unscrewed sufficiently to permit pivoting movement of the cutting tool 54. The radius of cut may be preset by adjusting the screw 60 by turning the wheel 68. The radius of cut is the distance along the center line of the cutter between the axis of the shaft 70 and the outer end of the cutter 62.

After the depth of cut and radius adjustments have been made, the cutting tool 54 is pivoted out of engagement with the work by means of the handle 74. The motor 66 is started, causing rotation of the cutter 62 by means of the flexible shaft 64. Motor 53 is also started which causes the pulley 26 to rotate by means of the belt 52. Rotation of the pulley 26 causes the face plate 38 to trace an elliptic path. Since the work piece is secured to the face plate it will also trace an elliptical path. The cutting tool 54 is then pivoted by means of the handle 74 into engagement with the rough stock on the face plate 38. As the cutting tool 54 pivots, the cutter 62 forms a concave elliptical cavity in the rough stock. When cutting deep bowls or hard materials, it may be necessary to make several cuts of successively increasing depth by advancing the cutter by means of the screw 60 or the base 78 after each cut. By forming the convex side first, the screw holes will enter the portion of the stock which is removed when the concave side is formed.

Long articles, such as furniture legs, may also be formed with this machine. The cutting tool 54, post 56, and base 78 are removed from the bed 4 by removing the nuts from the studs 92. The screw plate 50 is removed and replaced by a live center 102 and plate 104 which are the same as those mounted on the tailstock elliptic head.

The work piece is then mounted between the centers 102 of both elliptic forming heads. Rotational movement may be transmitted to the work piece and to the tailstock elliptic head by lathe dogs secured to the ends of the work piece. The eccentricity of the ellipse traced by each head may be adjusted by means of the lead screw 18 on each head. Since the adjustments are independent of each other, the ellipse formed at each end may have different dimensions. As an alternative, the heads may be rotated 90° relative to each other before the work piece is mounted between the centers, so that the major axis of the ellipse formed at one end of the work piece will be oriented at 90° to the ellipse at the opposite end. Another variation may be achieved by adjusting one of the heads to trace a circle and adjusting the other head to trace an ellipse. A tool rest, as is commonly used with woodwording lathes, is positioned adjacent to the work piece. The motor 53 which drives the headstock elliptic forming head is turned on. Rotation of the work piece drives the tailstock elliptic forming head. Forming of the work piece may be accomplished either by hand cutting tools, as is customary with woodworking lathes, or by a mechanical cutter, such as the rotary cutting tool 54.

The invention has been illustrated and described as a complete machine, mounted on a bench 2. The ellipse forming heads, however, may be secured to and used on a conventional lathe. The shaft 8 of the head, for example, could be supported by the headstock and the pulley 26 of the head could be driven by the lathe motor. It may also be preferred to use a tailstock ellipse forming head which is smaller than the headstock head. A large tailstock head is usually not necessary since the eccentricity of legs or posts is small. It is recognized that other variations and changes may be made in the disclosed embodiment of the invention without departing from the invention as set forth in the claims.

I claim:

1. In a lathe, a work holding fixture comprising a face plate, means for mounting a workpiece on the face plate, a guide plate, means securing the guide plate to the face plate in axially spaced relation, said guide plate having a transverse slot therein, support means, an axle having one end fixedly secured to said support means and extending through said guide plate slot, a pulley mounted for rotation on said axle between said guide plate and said support means, said pulley having a pair of blocks mounted on the radial face thereof, said blocks being in diametrical alignment and on opposite sides of the axle and extending into engagement with said guide plate slot, a positioning plate between said guide plate and said face plate and having a thickness substantially the same as the axial spacing between said guide plate and said face plate, a lead screw mounted transversely within the positioning plate, slide means in said positioning plate and having screw threads thereon cooperating with said lead screw for displacement of said slide means relative to the positioning plate, said axle having the opposite end fixedly secured to said slide means, said face plate having a transverse slot therein extending perpendicularly to the guide plate slot and a roller secured to the positioning plate and extending through the face plate slot whereby upon rotation of the pulley, the guide plate, the face plate and a workpiece which is secured to the face plate rotate in an elliptical path.

2. A lathe comprising a work holding fixture, means for securing a workpiece to the fixture, means for rotating the fixture in an elliptical path, a frame, means mounting the work holding fixture on the frame, a base plate, means mounting the base plate on the frame adjacent the fixture, a post on said base plate, cutter mounting means adjacent the workpiece securing means, bearing means on said cutter mounting means cooperating with said post for pivoting movement of the cutter mounting means relative to said post, a cutter extending outward from said cutter mounting means and toward the workpiece securing means, said base plate mounting means including a pivot plate pivotally attached to said frame forwardly of said outwardly extending cutter and means for swinging the cutter selectively about either of said pivots or an axis on the side of the cutter remote from the workpiece securing means, whereby the cutter mounting means and the base plate may be pivoted selectively for forming workpieces to concave and convex elliptical shapes, respectively.

3. A lathe comprising a work holding fixture, means for securing a workpiece to the fixture, means for rotating the fixture in an elliptical path, a frame, means mounting the work holding fixture on the frame, a base plate, means mounting the base plate on the frame adjacent the fixture, a post on said base plate, cutter mounting means adjacent the workpiece securing means, bearing means on said cutter mounting means cooperating with said post for pivoting movement of the cutter mounting means relative to said post, a cutter extending outward from said cutter mounting means and toward the workpiece securing means, said cutter being in the form of a rotary bit, means for rotating the cutter, said base plate mounting means including a pivot plate pivotally attached to said frame forwardly of said outwardly extending cutter and means for swinging the cutter about either of said pivots, whereby the cutter mounting means and the base plate may be pivoted selectively for forming workpieces to concave and convex elliptical shapes, respectively.

4. A lathe for forming elliptical shapes comprising a work holding fixture including a first plate and a second plate, each having opposite faces and an edge, means for securing said plates together in spaced relation, said first plate and said second plate having adjacent faces in substantially parallel spaced planes and having slots in said plates, the slot in said first plate extending at right angles to the slot in the second plate, a stationary shaft extending through the slot in the first plate, a roller, means for mounting the roller on the end of the shaft, the central axis of the roller being parallel to and eccentric from the longitudinal axis of the shaft, said roller extending through the slot in said second plate, means for rotating the dual pair of plates about said stationary shaft, means for securing a workpiece to the second plate, cutting means adjacent the fixture for engaging a workpiece, and means for swinging the cutting means in an arcuate path, the center of curvature of which is selectively on one of the opposite sides of the workpiece securing means whereby a concave or convex elliptical shape is formed selectively as the fixture rotates.

5. A lathe for forming elliptical shapes comprising a work holding fixture including a first plate and a second plate, each having opposite faces and an edge, means for securing said plates together in spaced relation, said first plate and said second plate having adjacent faces in substantially parallel spaced planes and having slots in said plates, the slot in said first plate extending at right angles to the slot in the second plate, a stationary shaft extending through the slot in the first plate, a bearing plate between said plates and extending substantially the full width of the space separating said adjacent faces of the plates, a lead screw extending transversely through the bearing plate, a collar engaging a portion of the lead screw, said collar being secured to the shaft, means for rotating the lead screw selectively for adjusting the position of the bearing plate relative to the shaft, a roller mounted for rotation on the face of the bearing plate and extending through the slot in the second plate, means for rotating said plates about said stationary shaft, means for securing a workpiece to the second plate, cutting means adjacent the fixture for engaging a workpiece, and means for swinging the cutting means in an arcuate path, the center of curvature of which is selectively on one of the opposite sides of the workpiece securing means, whereby a concave or convex elliptical shape is formed selectively as the fixture rotates.

References Cited in the file of this patent
UNITED STATES PATENTS

| | | |
|---|---|---|
| 270,479 | Quinn | Jan. 9, 1883 |
| 487,525 | Hansen | Dec. 6, 1892 |
| 1,474,868 | Walker | Nov. 21, 1923 |
| 1,998,395 | Houchin | Apr. 16, 1935 |
| 2,290,341 | Levitt | July 21, 1942 |
| 2,452,757 | Holdridge | Nov. 7, 1948 |
| 2,814,236 | Burgsmuller | Nov. 26, 1957 |